G. C. DUPONT.
FASTENER, SUPPORT, AND THE LIKE.
APPLICATION FILED MAR. 19, 1921.

1,385,311.

Patented July 19, 1921.
2 SHEETS—SHEET 1.

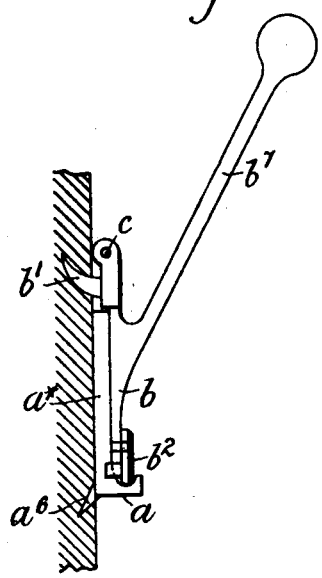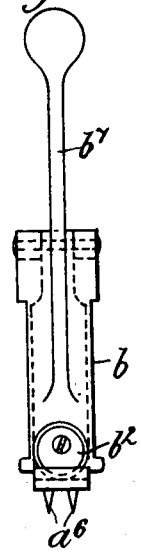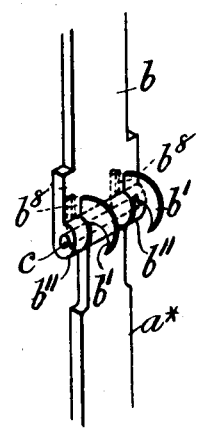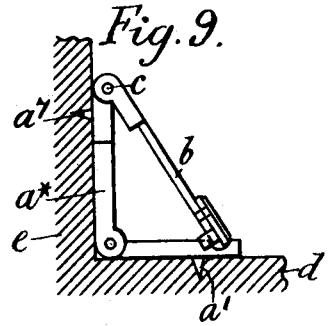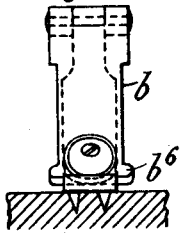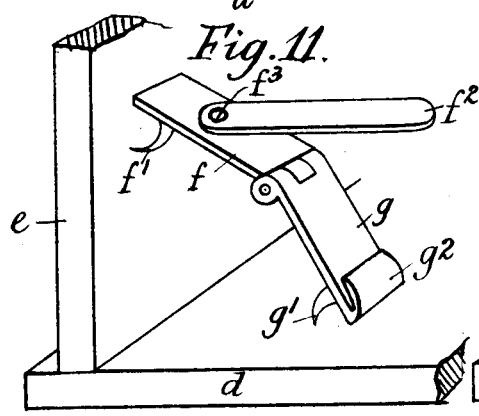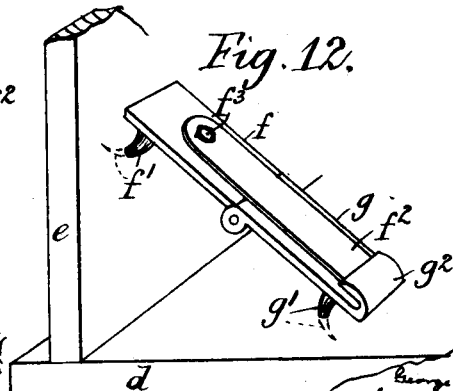

UNITED STATES PATENT OFFICE.

GEORGE CHARLES DUPONT, OF SOUTH CROYDON, ENGLAND, ASSIGNOR TO PHILIP AND TRACEY, LIMITED, OF FULHAM, LONDON, ENGLAND.

FASTENER, SUPPORT, AND THE LIKE.

1,385,311.      Specification of Letters Patent.      Patented July 19, 1921.

Application filed March 19, 1921. Serial No. 453,675.

*To all whom it may concern:*

Be it known that I, GEORGE CHARLES DUPONT, subject of George V, King of Great Britain and Ireland, residing at 260 Brighton road, South Croydon, in the county of Surrey, England, have invented certain new and useful Improvements in Fasteners, Supports, and the like, (for which I have filed applications in England dated November 17, 1919, December 1, 1919, and January 31, 1921, in which no patents have been granted,) of which the following is a specification.

This invention relates to devices for use in fastening articles in place, e. g. stair-rods, or for supporting articles, e. g. shelves, racks, curtain-rods, clothing, and for other purposes.

According to this invention, the device comprises at least two main members hinged together and each provided with a prong or prongs which, by suitably pressing upon the members, can be forced into a wood or other surface and thereby hold the device firmly in position. By means of such a device, nails, screws or the like are rendered unnecessary in fixing it in position. Moreover, time is economized both in fixing and removing the device.

Preferred embodiments of this invention are illustrated in the accompanying drawings, wherein—

Figs. 7 and 8 are side elevation and front elevation respectively of a fastener carrying a hat and coat hook.

Figs. 9 and 10 are side elevation and front elevation respectively of a modified form of stair-rod fastener, and Figs. 11 and 12 are perspective views of further modified forms of stair-rod fastener.

Fig. 13 is a side elevation of a modified form of prong; and

Fig. 14 illustrates in perspective the application of this prong to the device.

Referring to Figs. 1 to 6 of the drawings, the fastener comprises two main parts, namely, a rigid right-angle piece consisting of a horizontal leg $a$ and an upright leg $a^*$ and $b$ a flap hinged thereto. The hole for the hinge-pin $c$ may be formed either by drilling it through the parts $a^*$ and $b$ or by bending these parts over at their hinged extremities so as to inclose the pin.

The leg $a$ of the angle-piece is provided with prongs $a^1$ and with a depression $a^2$. The flap is provided with claws $b^1$, whose middle curved line is concentric or approximately so with the axis of the hinge, and also with a locking disk $b^2$.

In constructing the fastener, it is convenient to reduce the width of the hinge-end of the angle-piece, as shown, so as to reduce the overall width at the hinge, and to make the cheeks $b^3$ of substantial thickness so that holes can be safely formed therein, without unduly weakening them, to receive shanks $b^4$ of the claws. These holes and shanks are preferably made square so as to prevent any twisting movement of the claws. The shanks are riveted over so as to draw the shoulders of the claws, formed by the shanks, tightly against the cheeks $b^3$. The prongs $a^1$ may be fixed into the leg $a$ of the angle-piece in the same way.

Figure 1:
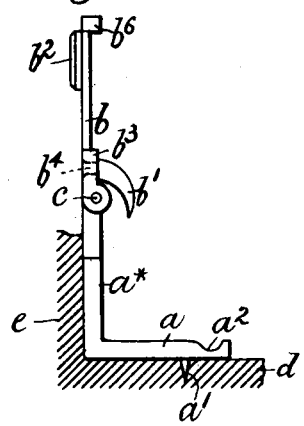
Figures 1 and 2 are side elevation and front elevation respectively of a stair-rod fastener when in its open position.
Figure 2:
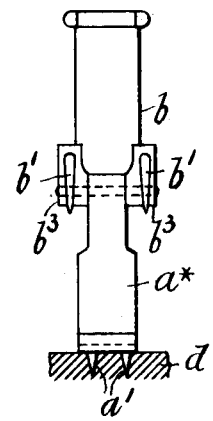
Figure 3:
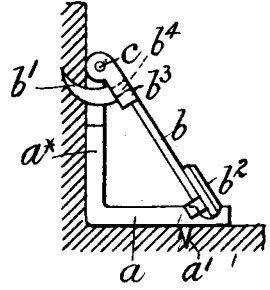
Figs. 3 and 4 are similar views respectively of the fastener in its closed position.
Figure 4:
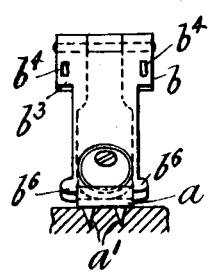
Figure 5:
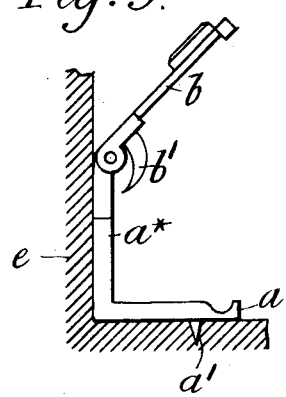
Fig. 5 is a view similar to Fig. 1 but showing the fastener partially closed.
Figure 6:
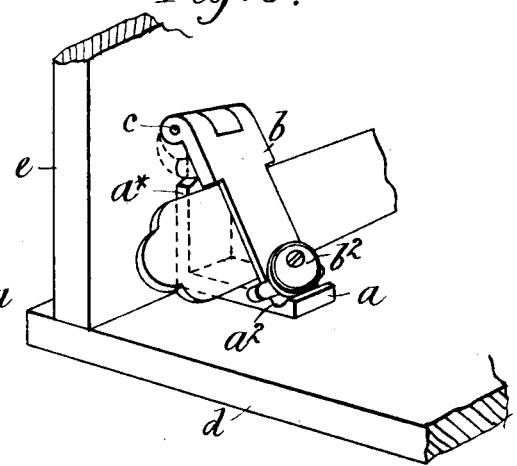
Fig. 6 is a perspective view showing the fastener closed and holding a stair-rod in position.

The fastener is used by first placing the angle-piece close into the angle between the tread $d$ and riser $e$ of the stairs, then pressing the prongs $a^1$ into the tread and, while holding the upright leg $a^*$ of the angle-piece firmly against the riser, swinging the flap down and thereby causing its claws to enter the riser, as shown clearly in Fig. 3. The disk $b^2$, which is eccentrically mounted on a pin $b^5$ projecting from the flap, is now turned down into the depression $a^2$, thereby effectually locking the flap in place and, therefore, preventing accidental withdrawal of the claws from the riser. In place of the eccentric any other suitable form of locking device may be employed.

The free end of the flap is furnished with ears $b^6$ which, when the flap is closed down, engage the sides of the leg $a$ thereby keeping the flap in place and preventing side-strain on the hinge.

The hat and coat hook shown in Figs. 7 and 8 is constructed in the same way as the stair-rod fastener shown in Figs. 1 to 6, excepting that the leg $a$ is shortened back, the flap $b$ folds back close to the upright leg $a^*$, and the prongs, shown at $a^6$, are placed at the external angle of the device and are inclined downwardly.

The device shown in Figs. 7 and 8 can be fixed on a wall or on a wood ceiling or other suitable surface by first placing the leg $a^*$ against the surface, then pressing the prongs $a^6$ thereinto, then swinging the flap on its hinge so as to cause the claws to enter the surface, as shown in Fig. 7, and finally locking the flap in place by means of the disk $b^2$. The flap may be provided with a hat and coat hook $b^7$, or with a hook for suspending a curtain rod, or with a projection or lug for supporting a shelf, rack, or other article, or with any other means for suspending supporting or fastening articles thereon.

The modified form of stair-rod fastener shown in Figs. 9 and 10 differs from that shown in Figs. 1 to 6 in that the two legs of the angle-piece are hinged together right in the angle, and the claws on the flap are replaced by straight prongs $a^7$ on the leg $a^*$. In fixing this form of fastener in place the prongs $a^1$ and $a^7$ are pressed into the tread and riser respectively, and the flap $b$ is swung down and locked in the manner above described.

In the further modification illustrated in Figs. 11 and 12, the fastener consists of two parts $f$ and $g$, hinged together in the middle or thereabout, each of them being provided with a pair of curved claws, a claw of each pair being shown at $f^1$ and $g^1$ respectively, and a locking flap $f^2$ hinged at $f^3$ to the part $f$. In using this form of fastener, it is placed across the angle between the tread and riser, in some such position as that shown in Fig. 11, with the free ends of the parts $f$ and $g$ in close engagement with the tread and riser respectively, and then the claws are pressed into the tread and riser respectively by pressing down and straightening out the two parts $f$ and $g$, the free ends of these parts acting as fulcra during this operation.

The locking flap $f^2$ is finally swung on its pivot $f^3$ and pushed friction-tight under a backwardly-turned lip $g^2$ formed at the lower end of the part $g$. The fastener is now rendered rigid in itself and therefore cannot be moved either upward or downward. The hinge is constructed in known manner so as to prevent the parts $f$ and $g$ of the flap being pushed beyond the position of alinement with one another toward the angle between the tread and riser.

It will be obvious that instead of fixing the prongs and claws in the fastener in the manner above described, they may be fixed by screwing or in any other suitable known manner. Further, they may be formed by punching them up from the metal or other material of which the fastener is formed. Again, in place of the disk $b^2$, other suitable means may be employed for locking the flap in place, e. g., a T-headed pin mounted in the base and passing through a slit in the flap and arranged so that its head can be turned across the slit when the flap has been closed down.

By arranging the prongs and claws (or prongs only in the case of the fasteners shown in Figs. 9 and 10, or claws only in the case of the fastener shown in Figs. 11 and 12) so that they are directed away from one another as above described they become so firmly anchored in the stair or other surface that they hold the fastener in place quite as securely as screws or nails would do. The prongs and claws possess the further advantage that no tools are needed to fix the fastener in place. Moreover, the act of lifting the flap frees the fastener and enables it to be removed without further trouble.

The flap, when being turned down, acts as a lever, the short arm of which is the portion between the pin $c$ and the claws, and the long arm of which is the remaining portion. Thus, considerable leverage is obtained when pressing the claws into the wood or the like with the minimum of effort on the part of the operator.

In some cases, according to this invention, the fastener consists of a plain plate carrying a rotatable disk or the like to which is hinged, at diametrically opposite points thereon a pair of rods whose outer ends are provided with prongs, the arrangement being such that when the disk or the like is partially rotated the prongs are caused to enter the tread and riser respectively or other desired surface. In constructing such a fastener it is preferable to arrange the disk or the like on the underside of the plain plate and to provide it with a shank which extends through and is rotatably mounted in the plain plate, the shank being squared at its upper end to take a key whereby it can be rotated so as to cause the rods to move outward for the purpose of forcing the prongs into the stair or other surface. The rods may be suitably arranged in guides in order to keep them and the disk or the like in place.

The claw shown in Figs. 13 and 14 is so shaped that it holds itself in position on the device without riveting, screwing or like operation. It is formed with a recess $b^8$, to receive the inner or hinge-end of the flap $b$, and with a hole $b^9$ to receive the hinge-pin $c$ which connects the leg $a^*$ to the flap $b$. This claw may be stamped out of sheet-steel. In assembling such claws, they are placed in position as shown in Fig. 14, that is, with their recesses occupied by the hinge-end of the flap and their holes in line with the hinge-pin holes in the ears $b^{11}$ of the flap. The whole is then secured together by passing the hinge-pin $c$ through the ears $b^{11}$, the holes $b^9$ of the claws, and the upper end of the leg $a^*$. Thus, when the flap is turned in the manner already described, the claws move with it.

In some cases the gap or fork in the prong may be dispensed with and the contiguous end of the said web or hinge-end of the flap be fitted closely to the plain edge of the prong so that when the flap moves the prong moves with it.

The prongs may be applied to the leg $a$ and to the form of fastener shown in Figs. 11 and 12 by providing the latter with a pin or pins and slots so that the prongs (which in this case may be straight) can be slid or mounted on the pin or pins and the forked end of the prongs engaged with the slots.

A convenient manner of constructing the leg $a$ is to fold back a portion of its free end and provide the extremity of the latter with a depression into which the free end of the flap $b$ and the locking eccentric or other locking device provided thereon can take. The prongs can be carried by the portion of the leg $a$ which is overlaid by its returned end portion, and they may either be mounted thereon or therein in the manner described above, or they may be punched outward from but connected with the leg $a$, or they may be separate plain headed prongs the heads lying between the leg $a$ and its turned-back end.

In some cases, the prongs may be stamped out of and formed integrally with the material of which the device is made.

The device may be made of metal, wood, glass or other suitable material.

The prong itself, applied to a suitable base plate or support as above described, may be used as a hook for supporting articles.

I claim:—

1. A device for attachment to a surface, said device consisting of members hinged together, each member being provided with one or more prongs and also provided with locking means distinct from said members, the arrangement being such that when the one or more prongs have been entered into the surface and the locking means have been brought into the locking position, the device becomes secured firmly to the surface.

2. A device for attachment to a surface, said device consisting of an angular member provided with prongs, a flap hinged to said angular member and also provided with prongs and means for locking the angular member and flap together.

3. A device for attachment to a surface, said device consisting of an angular member comprising two legs hinged together and each provided with prongs, a flap hinged to one of said members, and locking means for securing the angular member and flap together.

4. A device for attachment to a surface, said device consisting of an angular member provided with straight prongs, a flap hinged to said angular member and provided with curved prongs which are disposed in close proximity to the hinge so that the act of turning down the flap forces the curved prongs into the said surface, and means carried by said flap for locking the angular member and flap together.

5. A device for attachment to a surface, said device consisting of a member provided with prongs, a flap, a hinge-pin for hinging the said member and flap together, curved prongs mounted on said hinge-pin and operatively engaging said flap so as to move therewith, and means for locking the said member and flap together.

6. A device for attachment to a surface, consisting of members hinged together overlapping in operative position and provided with prongs, the arrangement being such that by pressing the prongs on one member into the surface and then turning down the other member over the first member so as to press its points into the surface the device becomes securely attached to the said surface.

In testimony whereof, I have signed my name to this specification in the presence of the subscribing witness.

GEORGE CHARLES DUPONT.

Witness:
H. T. P. GEE.